(12) United States Patent
Zhang et al.

(10) Patent No.: US 11,956,797 B2
(45) Date of Patent: Apr. 9, 2024

(54) TECHNIQUES FOR FULL-DUPLEX SCHEDULING ACROSS MULTIPLE USER EQUIPMENT

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 17/443,209

(22) Filed: Jul. 22, 2021

(65) Prior Publication Data
US 2023/0028349 A1 Jan. 26, 2023

(51) Int. Cl.
*H04W 72/23* (2023.01)
*H04L 5/14* (2006.01)

(52) U.S. Cl.
CPC ............. *H04W 72/23* (2023.01); *H04L 5/14* (2013.01)

(58) Field of Classification Search
None
See application file for complete search history.

(56) References Cited

U.S. PATENT DOCUMENTS

| | | | |
|---|---|---|---|
| 2014/0177542 A1* | 6/2014 | Novak | H04W 72/23 370/329 |
| 2015/0333896 A1* | 11/2015 | Damnjanovic | H04W 74/0808 370/277 |
| 2018/0184439 A1* | 6/2018 | Lee | H04W 72/21 |
| 2018/0295651 A1* | 10/2018 | Cao | H04W 74/0833 |
| 2019/0132092 A1* | 5/2019 | Chen | H04L 1/1861 |
| 2020/0045706 A1* | 2/2020 | Shin | H04W 72/23 |
| 2021/0204192 A1* | 7/2021 | Lee | H04L 67/62 |
| 2021/0314747 A1* | 10/2021 | Lee | H04L 41/0677 |
| 2021/0314982 A1* | 10/2021 | Panteleev | H04L 5/0053 |
| 2021/0337588 A1* | 10/2021 | Lee | H04W 72/23 |
| 2022/0338222 A1* | 10/2022 | Kim | H04L 5/00 |
| 2022/0393829 A1* | 12/2022 | Kim | H04L 1/18 |
| 2023/0014238 A1* | 1/2023 | Pocovi | H04L 5/14 |

* cited by examiner

*Primary Examiner* — Clemence S Han
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may receive configuration information for configuring a plurality of semi-persistent resources for a plurality of UEs, the plurality of semi-persistent resources including one or more semi-persistent resources configured for the first UE. The UE may receive an indication to activate the plurality of semi-persistent resources across the plurality of UEs. The UE may communicate, based at least in part on the indication, using the one or more semi-persistent resources. Numerous other aspects are described.

30 Claims, 9 Drawing Sheets

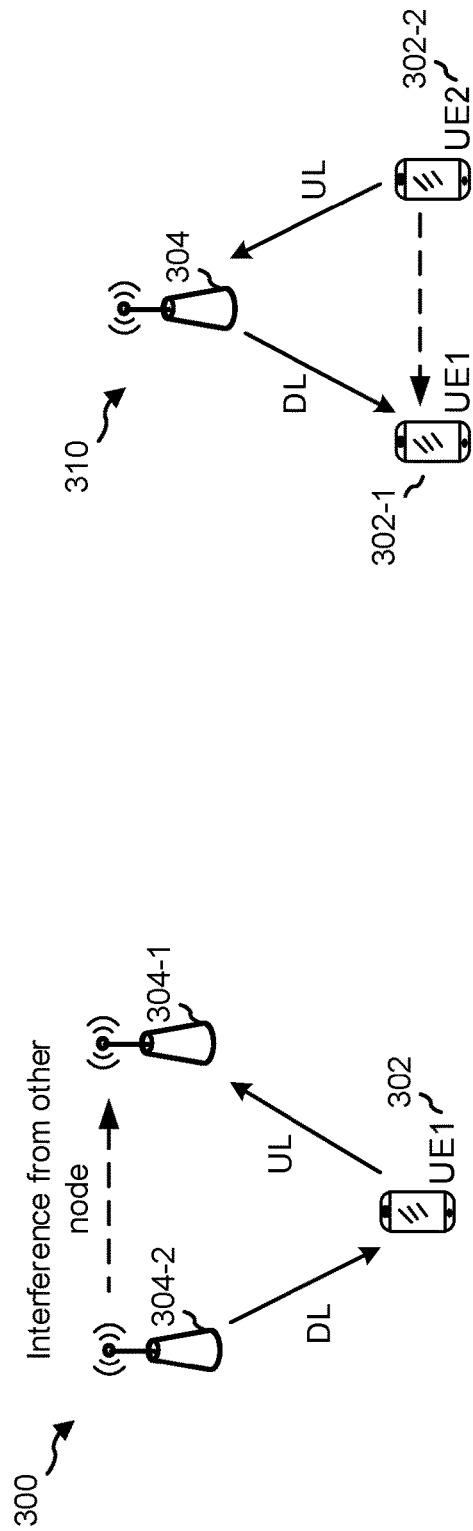
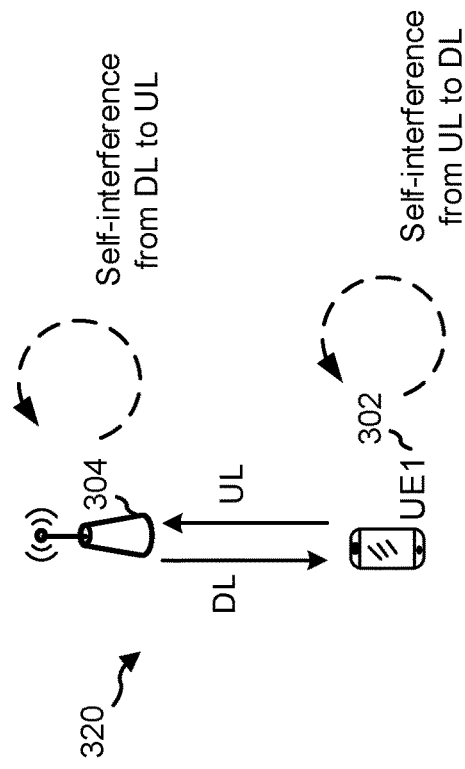
FIG. 3B
FIG. 3C
FIG. 3A

TECHNIQUES FOR FULL-DUPLEX SCHEDULING ACROSS MULTIPLE USER EQUIPMENT

FIELD OF THE DISCLOSURE

Aspects of the present disclosure generally relate to wireless communication and to techniques and apparatuses for full-duplex scheduling across multiple user equipment (UEs).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving configuration information for configuring a plurality of semi-persistent resources for a plurality of UEs, the plurality of semi-persistent resources including one or more semi-persistent resources configured for the first UE. The method may include receiving an indication to activate the plurality of semi-persistent resources across the plurality of UEs. The method may include communicating, based at least in part on the indication, using the one or more semi-persistent resources.

In some aspects, the configuration information is received in a single radio resource control message.

In some aspects, the indication is received via group common downlink control information signaling.

In some aspects, the method includes identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein communicating on the one or more semi-persistent resources further comprises performing the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication activates the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to a method of wireless communication performed by a base station. The method may include transmitting configuration information for configuring a plurality of semi-persistent resources for a plurality of UEs, the plurality of semi-persistent resources including one or more semi-persistent resources configured for a first UE. The method may include transmitting an indication to activate the plurality of semi-persistent resources across the plurality of UEs. The method may include communicating, based at least in part on the indication, using the one or more semi-persistent resources.

In some aspects, the configuration information is transmitted in a single radio resource control message.

In some aspects, the indication is transmitted via group common downlink control information signaling.

In some aspects, the method includes identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the one or more processors, to communicate on the one or more semi-persistent resources, are configured to perform the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication is configured to activate the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to a first UE for wireless communication. The first UE may include a memory and one or more processors coupled to the memory. The one or more processors may be configured to receive configuration information for configuring a plurality of semi-persistent resources for a plurality of UEs, the plurality of semi-persistent resources including one or more semi-persistent resources configured for the first UE. The one or more processors may be configured to receive an indication to activate the plurality of semi-persistent resources across the plurality of UEs. The one or more processors may be configured to communicate, based at least in part on the indication, using the one or more semi-persistent resources.

In some aspects, the configuration information is received in a single radio resource control message.

In some aspects, the indication is received via group common downlink control information signaling.

In some aspects, the one or more processors are further configured to: identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, wherein the one or more processors, to communicate on the one or more semi-persistent resources, are configured to: perform the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication activates the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to a base station for wireless communication. The base station may include a memory and one or more processors coupled to the memory. The one or more processors may be configured to transmit configuration information for configuring a plurality of semi-persistent resources for a plurality of UEs, the plurality of semi-persistent resources including one or more semi-persistent resources configured for a first UE. The one or more processors may be configured to transmit an indication to activate the plurality of semi-persistent resources across the plurality of UEs. The one or more processors may be configured to communicate, based at least in part on the indication, using the one or more semi-persistent resources.

In some aspects, the configuration information is transmitted in a single radio resource control message.

In some aspects, the indication is transmitted via group common downlink control information signaling.

In some aspects, the one or more processors are further configured to: identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the one or more processors, to communicate on the one or more semi-persistent resources, are configured to perform the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication is configured to activate the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to a non-transitory computer-readable medium that stores a set of instructions for wireless communication by a first UE. The set of instructions, when executed by one or more processors of the UE, may cause the UE to receive configuration information for configuring a plurality of semi-persistent resources for a plurality of UEs, the plurality of semi-persistent resources including one or more semi-persistent resources configured for the first UE. The set of instructions, when executed by one or more processors of the UE, may cause the UE to receive an indication to activate the plurality of semi-persistent resources across the plurality of UEs. The set of instructions, when executed by one or more processors of the UE, may cause the UE to communicate, based at least in part on the indication, using the one or more semi-persistent resources.

In some aspects, the configuration information is received in a single radio resource control message.

In some aspects, the indication is received via group common downlink control information signaling.

In some aspects, the one or more instructions further cause the UE to: identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the one or more instructions, that cause the UE to communicate on the one or more semi-persistent resources, cause the UE to perform the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication activates the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to a non-transitory computer-readable medium that stores a set of instructions for wireless communication by a base station. The set of instructions, when executed by one or more processors of the base station, may cause the base station to transmit configuration information for configuring a plurality of semi-persistent resources for a plurality of UEs, the plurality of semi-persistent resources including one or more semi-persistent resources configured for a first UE. The set of instructions, when executed by one or more processors of the base station, may cause the base station to transmit an indication to activate the plurality of semi-persistent resources across the plurality of UEs. The set of instructions, when executed by one or more processors of the base station, may cause the base station to communicate, based at least in part on the indication, using the one or more semi-persistent resources.

In some aspects, the configuration information is transmitted in a single radio resource control message.

In some aspects, the indication is transmitted via group common downlink control information signaling.

In some aspects, the one or more instructions further cause the base station to: identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the one or more instructions, that cause the base station to communicate on the one or more semi-persistent resources, cause the base station to perform the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication is configured to activate the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to an apparatus for wireless communication. The apparatus may include means for receiving configuration information for configuring a plurality of semi-persistent resources for a plurality of UEs, the plurality of semi-persistent resources including one or more semi-persistent resources configured for the apparatus. The apparatus may include means for receiving an indication to activate the plurality of semi-persistent resources across the plurality of UEs. The apparatus may include means for communicating, based at least in part on the indication, using the one or more semi-persistent resources.

In some aspects, the configuration information is received in a single radio resource control message.

In some aspects, the indication is received via group common downlink control information signaling.

In some aspects, the apparatus includes means for identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the means for communicating on the one or more semi-persistent resources further comprises means for performing the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication activates the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Some aspects described herein relate to an apparatus for wireless communication. The apparatus may include means for transmitting configuration information for configuring a plurality of semi-persistent resources for a plurality of UEs, the plurality of semi-persistent resources including one or more semi-persistent resources configured for a first UE. The apparatus may include means for transmitting an indication to activate the plurality of semi-persistent resources across the plurality of UEs. The apparatus may include means for communicating, based at least in part on the indication, using the one or more semi-persistent resources.

In some aspects, the configuration information is transmitted in a single radio resource control message.

In some aspects, the indication is transmitted via group common downlink control information signaling.

In some aspects, the apparatus includes means for identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein the means for communicating on the one or more semi-persistent resources further comprises means for performing the communication on the semi-persistent resource in accordance with the one or more sets of parameters.

In some aspects, the one or more sets of parameters include at least one of: a modulation and coding scheme, a beam, a transmit power, a precoder, a rank indicator, a timing advance, or a guard band.

In some aspects, the one or more sets of parameters are included in a plurality of sets of parameters configured for different semi-persistent resources.

In some aspects, the one or more sets of parameters include a first set of parameters associated with a full-duplex communication mode and a second set of parameters associated with a half-duplex communication mode.

In some aspects, the plurality of semi-persistent resources includes a first semi-persistent resource of a first length and a second semi-persistent resource of a second length different than the first length.

In some aspects, the one or more semi-persistent resources include a first semi-persistent resource on a first component carrier and a second semi-persistent resource on a second component carrier, and the indication is configured to activate the first semi-persistent resource and the second semi-persistent resource.

In some aspects, the first component carrier is associated with a first subcarrier spacing and the second component carrier is associated with a second subcarrier spacing different than the first subcarrier spacing.

In some aspects, the indication indicates the plurality of semi-persistent resources based at least in part on a group configuration identifier associated with the plurality of semi-persistent resources.

In some aspects, the indication indicates a UE identifier and a corresponding scheduling field for each UE of the plurality of UEs.

In some aspects, a semi-persistent resource, of the plurality of semi-persistent resources, includes a first sub-band and a second sub-band that are non-contiguous with each other.

In some aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In some aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
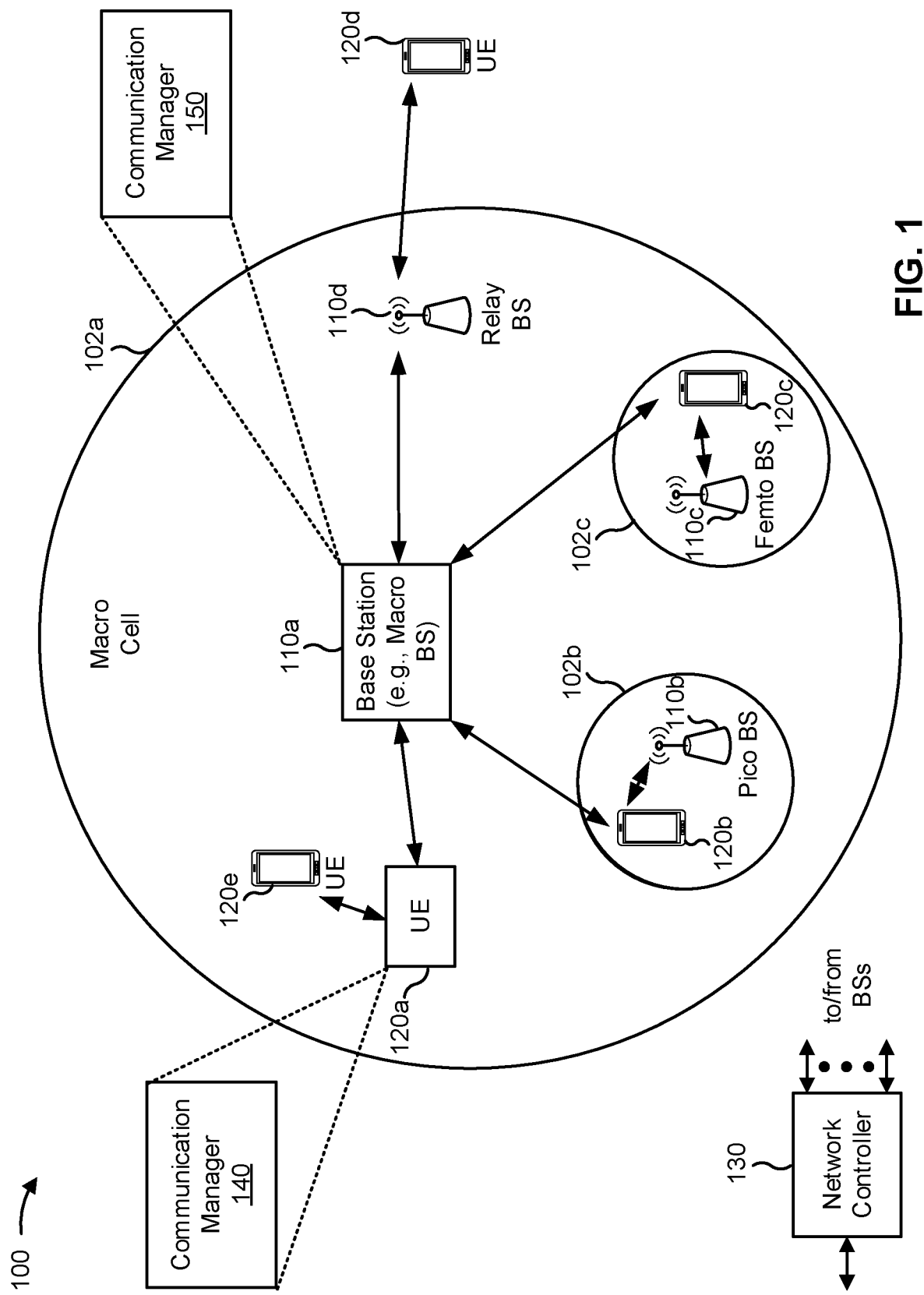
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information for configuring a plurality of semi-persistent resources for a plurality of UEs, the plurality of semi-persistent resources including one or more semi-persistent resources configured for the first UE; receive an indication to activate the plurality of semi-persistent resources across the plurality of UEs; and communicate, based at least in part on the indication, using the one or more semi-persistent resources. Additionally, or alternatively, the communication manager 140 may perform one or more other operations described herein.

In some aspects, the base station 110 may include a communication manager 150. As described in more detail elsewhere herein, the communication manager 150 may transmit configuration information for configuring a plurality of semi-persistent resources for a plurality of UEs, the plurality of semi-persistent resources including one or more semi-persistent resources configured for a first UE; transmit an indication to activate the plurality of semi-persistent resources across the plurality of UEs; and communicate, based at least in part on the indication, using the one or more semi-persistent resources. Additionally, or alternatively, the communication manager 150 may perform one or more other operations described herein.

As indicated above, FIG. 1 is provided as an example. Other examples may differ from what is described with regard to FIG. 1.

Figure 2:
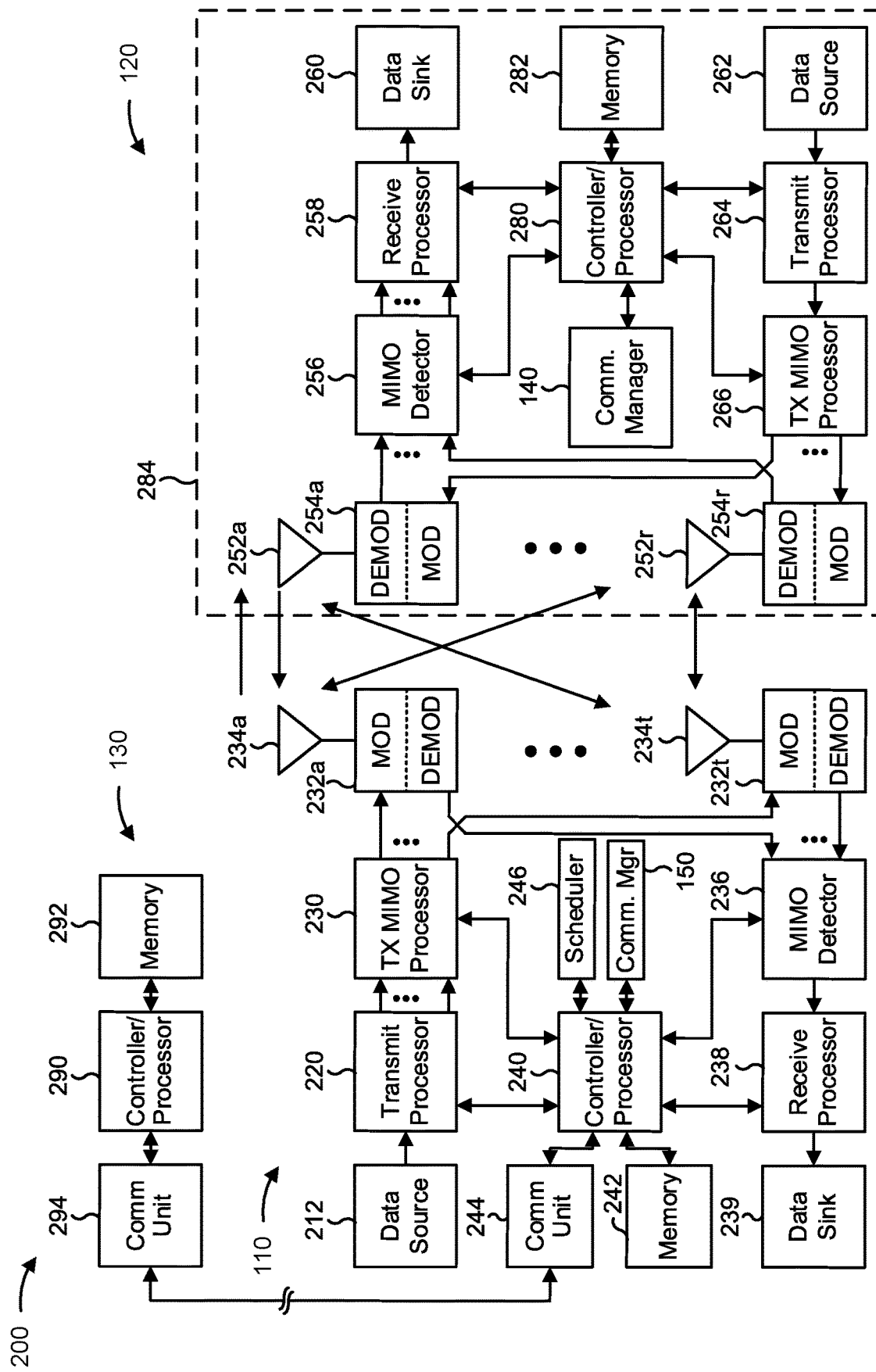
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with activation of semi-persistent resources, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, a UE 120 includes means for receiving configuration information for configuring a plurality of semi-persistent resources for a plurality of UEs, the plurality of semi-persistent resources including one or more semi-persistent resources configured for the UE 120; means for receiving an indication to activate the plurality of semi-persistent resources across the plurality of UEs; and/or means for communicating, based at least in part on the indication, using the one or more semi-persistent resources. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting configuration information for configuring a plurality of semi-persistent resources for a plurality of UEs, the plurality of semi-persistent resources including one or more semi-persistent resources configured for a first UE; means for transmitting an indication to activate the plurality of semi-persistent resources across the plurality of UEs; and/or means for communicating, based at least in part on the indication, using the one or more semi-persistent resources. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. An FD communication is a communication that utilizes overlapped time resources at a single node for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indication (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG), as described in more detail in connection with FIG. 4.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. Thus, the UEs UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304.

In FIGS. 3A-3C, interference is indicated by dashed lines. Interference can occur between nodes of examples 300, 310, 320 (referred to as "cross-link interference"). Examples of cross-link interference are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, crosstalk between components, or the like. Examples of self-interference at a UE 302 (from an uplink transmission to a downlink reception) and at a BS 304 (from a downlink transmission to an uplink reception) are shown in FIG. 3C. It should be noted that the above-described cross-link interference and self-interference conditions can occur in HD deployments and in FD deployments.

As indicated above, FIGS. 3A-3C are provided as one or more examples. Other examples may differ from what is described with regard to FIGS. 3A-3C.

Figure 4:
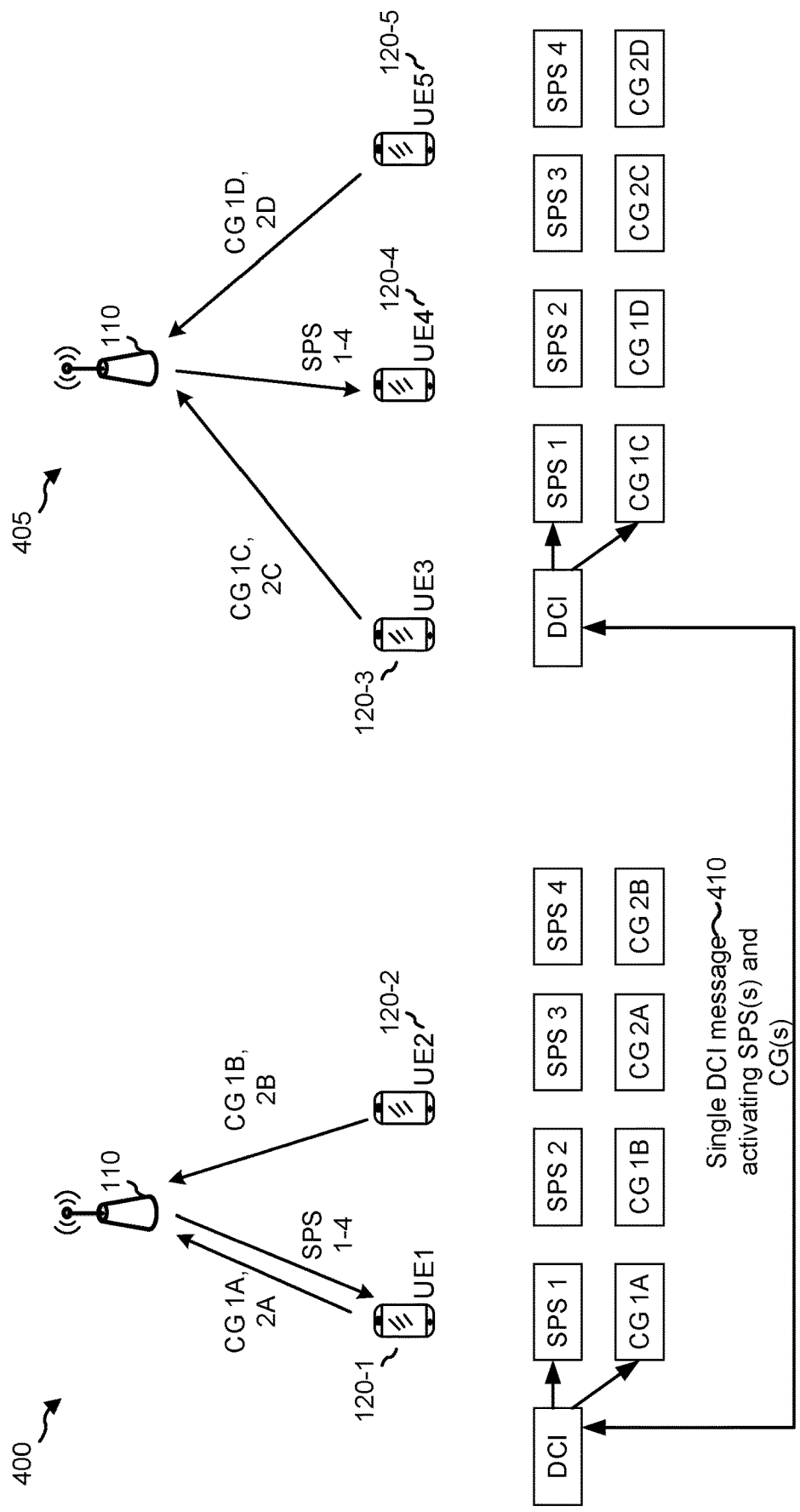
FIG. 4 is a diagram illustrating examples of FD and half duplex (HD) communication associated with semi-persistent resources, in accordance with the present disclosure.

FIG. 4 is a diagram illustrating examples 400 and 405 of FD and HD communication associated with semi-persistent resources, in accordance with the present disclosure. FIG. 4 includes a BS 110 and various UEs 120 (shown as UE 120-1 through UE 120-5). In the SPS and CG configurations shown in example 400 and in example 405, the horizontal direction represents time. Thus, an SPS illustrated above a CG at least partially overlaps with that CG in time (e.g., SPS 1 time-overlaps CG 1A in example 400).

Example 400 involves FD communication at a BS 110 and at a UE 120-1. In example 400, UE 120-1 is configured with SPS occasions 1, 2, 3, and 4. UE 120-1 is also scheduled with CG occasions 1A and 2A. UE 120-2 is scheduled with CG occasions 1B and 2B. As illustrated, SPS 1 overlaps CG 1A in time, SPS 2 overlaps CG 1B in time, SPS 3 overlaps CG 2A in time, and SPS 4 overlaps CG 2B in time.

SPS involves the configuration of periodic resources (referred to herein as "SPS occasions") for downlink communication, such as to a UE 120. SPS is suitable for communications involving data arriving in periodic bursts. The usage of persistent resources reduces overhead associated with DCI. A subset of resource allocation information for the periodic resources may be provided via radio resource control (RRC) signaling (where the resource allocation information conveyed by the RRC signaling is referred to as an SPS configuration, and the resource allocation information indicates the SPS occasions), and remaining resource allocation information may be provided via DCI. The DCI also acts as an activation trigger for the SPS configuration. An SPS configuration may indicate a periodicity (e.g., a time interval between consecutive SPS occasions), a resource for feedback, a modulation and coding scheme, and so on.

A CG indicates a resource allocation (referred to as a CG occasion) on which a UE 120 can perform an uplink transmission without having to receive an individual resource allocation via DCI. A UE 120 may receive a CG configuration via configuration information. The CG configuration may indicate an MCS, a resource allocation, and so on. In some aspects, a subset of resource allocation information for the CG may be provided via RRC signaling (where the resource allocation information conveyed by the RRC signaling is referred to as the CG configuration, and the resource allocation information indicates CG occasions), and remaining resource allocation information may be provided via DCI. The DCI also acts as an activation trigger for the CG configuration.

As used herein, "semi-persistent resource" can refer to an SPS occasion, a CG occasion, or the resource allocation indicated by an SPS configuration or a CG configuration. In some aspects, "semi-persistent resource" may refer to a resource allocation indicated by DCI activating an SPS configuration or a CG configuration.

As mentioned above, the UE 120-1 and the BS 110 may both perform FD communication in example 400. For example, CG 1A overlaps in time with SPS 1 and CG 2A overlaps in time with SPS 3. Therefore, on these CG occasions and SPS occasions, the UE 120-1 and the BS 110-2 may perform FD communication with each other. There are other resources on which the BS 110 and not the UE 120-1 may perform FD communication. For example, SPS 2 overlaps with CG 1B, which is configured for the UE 120-2. Therefore, the BS 110 may perform FD communication with the UE 120-2, and both of the UE 120-1 and the UE 120-2 may perform HD communication at the time associated with SPS 2 and CG 1B.

In example 405, each of the UEs 120-3, 120-4, and 120-5 perform HD communication while the BS 110 performs FD communication. In example 405, the UE 120-3 is configured with CGs 1C and 2C, the UE 120-4 is configured with SPSs 1-4, and the UE 120-5 is configured with CGs 1D and 2D. The BS 110 may perform FD communication (that is, a downlink communication with the UE 120-4 and an uplink communication with either the UE 120-3 or the UE 120-5) during each of the SPS occasions of example 405.

FD communication may involve different parameters than HD communication. For example, FD communications may be associated with challenges that are less applicable or not applicable for HD communications, such as self-interference, cross-link interference, transmit power limitations, and so on. The DCI used to activate an SPS or a CG can convey information regarding a resource allocation of the SPS or the CG. However, DCI for an SPS or a CG may be signaled separately for each UE. If DCI is signaled separately for each SPS or CG configuration, then a UE may not be able to determine whether the SPS or CG overlaps in time with another communication (such as a communication on an SPS or a CG configured for a different UE, in a different component carrier, and/or in a different sub-band), which impedes the ability of the UE to effectively perform HD and FD communication. For example, the UE may use the same set of parameters across HD and FD communication, which may lead to increased interference, decreased throughput, and an increased occurrence of dropped communications.

Some techniques and apparatuses described herein provide DCI that activates multiple SPS or CG configurations, such as across a plurality of UEs, a plurality of component carriers, and/or a plurality of sub-bands. For example, as shown by reference number 410, a DCI message (e.g., a group common DCI message) may carry an indication to activate an SPS configuration and a CG configuration. The DCI message may include information indicating resource allocations for the SPS configuration and the CG configuration. In example 400, the DCI message may activate SPS 1, 2, 3, 4 and CG 1A, 2A, 1B, and 2B, and may be received by both the UE 120-1 and the UE 120-2. Each of the UE 120-1 and the UE 120-2 may be able to determine whether a communication on a given SPS occasion or a given CG occasion is an FD communication or an HD communication. For example, by reference to the resource allocations indicated by the DCI message for SPS 1, SPS 2, CG 1A, and CG 1B, the UE 120-1 may determine that FD communication at the UE 120-1 is associated with SPS 1 and HD communication at the UE 120-1 is associated with SPS 2. In some aspects, the UE 120-1 may use different sets of parameters based at least in part on whether a semi-persistent resource is associated with an FD communication or an HD communication. For example, the UE 120-1 may use a first set of parameters for HD communication and a second set of parameters for FD communication. In this way, interference is reduced, throughput is increased, and the occurrence of dropped communications is reduced.

As indicated above, FIG. 4 is provided as an example. Other examples may differ from what is described with regard to FIG. 4. For example, the SPS occasions and CG occasions of FIG. 4 may be different or may be arranged differently. As another example, different SPS occasions or CG occasions may be associated with different lengths. As yet another example, an SPS occasion and a CG occasion may only partially overlap each other. As still another example, two CG occasions may be full-duplexed with each other, or two SPS occasions may be full-duplexed with each other.

Figure 5:
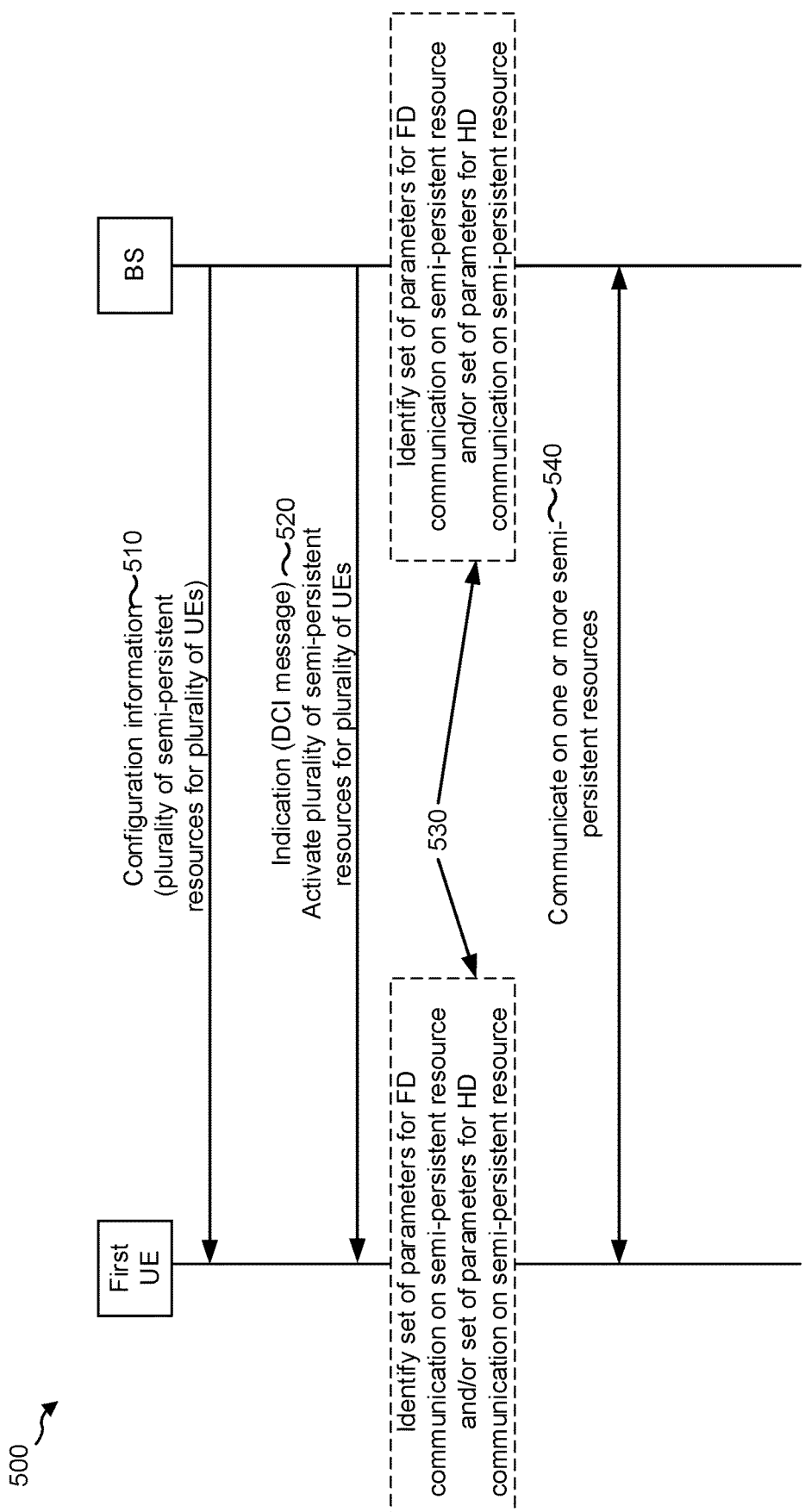
FIG. 5 is a diagram illustrating an example of signaling associated with FD and HD communication associated with semi-persistent resources, in accordance with the present disclosure.

FIG. 5 is a diagram illustrating an example 500 of signaling associated with FD and HD communication associated with semi-persistent resources, in accordance with the present disclosure. As shown, FIG. 5 includes a first UE (e.g., UE 120, one or more of the UEs 302 of FIG. 3, one or more of the UEs 120 of FIG. 4) and a BS (e.g., BS 110, one or more of the BSs 304 of FIG. 3, the BS 110 of FIG. 4). In some aspects, the operations described in example 500 as being performed by the first UE may be performed by an apparatus of the UE 120 such as communication manager 140. In some aspects, the operations described in example 500 as being performed by the BS may be performed by an apparatus of the BS 110 such as communication manager 150.

As shown in FIG. 5, and by reference number 510, the BS may transmit, and the first UE may receive, configuration information. In some aspects, the BS may transmit the configuration information via RRC signaling. The BS may transmit the configuration information to a plurality of UEs including the first UE. For example, the BS may transmit the configuration information to each UE that is to be configured with an SPS configuration or a CG configuration that can be activated by a single DCI message. As another example, the BS 110 may transmit configuration information to the UEs 120-1 and 120-2 of example 400, or to the UEs 120-3, 120-4, and 120-5 of example 405. As still another example, the BS may transmit the configuration information to each UE associated with a CG or SPS that is involved in an FD communication (whether the FD communication is at the UE, another UE, or the BS). In some aspects, the configuration information is transmitted via a single RRC message.

The configuration information may configure a plurality of semi-persistent resources. For example, the configuration information may configure multiple SPS configurations, multiple CG configurations, one or more SPS configurations and one or more CG configurations, or a combination thereof.

In some aspects, the configuration information may indicate one or more sets of parameters. For example, the configuration information may indicate one or more parameters including an MCS, a beam, a transmit power parameter, a precoder, a rank indicator, a timing advance, or a guard band. In some aspects, the configuration information may indicate multiple sets of parameters. A set of parameters can be indicated for a particular duplexing state (e.g., HD mode or FD mode) or a particular set of semi-persistent resources (e.g., a particular set of SPS occasions or CG occasions). In some aspects, a set of parameters may be associated with a pattern of SPS occasions or CG occasions. For example, a UE may be configured with sets of parameters that can hop across different SPS or CG occasions. For example, for a first UE, where SPS occasion 1 and 3 are overlapped with a CG configuration 1 of UE 2, and SPS occasion 2 and 4 are overlapped with a CG configuration 2 of UE 3, the first UE may be configured to use a first set of parameters for SPS occasions 1 and 3 and a second set of parameters for SPS occasions 2 and 4. Thus, a UE can switch between sets of parameters across different SPS or CG occasions.

In some aspects, the configuration information may indicate a group configuration identifier. In some aspects, a group configuration identifier may be associated with a plurality of semi-persistent resources, such as a plurality of SPS configurations, a plurality of CG configurations, or a plurality including one or more SPS configurations and one or more CG configurations. In some aspects, a group configuration identifier may be associated with a single UE (e.g., for a plurality of semi-persistent resources configured for the single UE). In some aspects, a group configuration identifier may be associated with a plurality of UEs (e.g., for a plurality of semi-persistent resources, where each UE of the plurality of UEs is configured with one or more semi-persistent resources). In some aspects, a group configuration identifier may be associated with semi-persistent resources on a plurality of component carriers (as described in more elsewhere herein). In some aspects, a group configuration identifier may be associated with semi-persistent resources on a plurality of non-contiguous sub-bands (as described in more detail elsewhere herein). The group configuration identifier may be used to activate the plurality of semi-persistent resources, as described below.

In some aspects, semi-persistent resources may be configured across multiple component carriers. A component carrier (sometimes abbreviated "CC") is a frequency region used for carrier aggregation. A UE may use multiple component carriers to communicate using carrier aggregation. A component carrier may have a configuration involving various parameters, such as a numerology. A numerology may indicate a subcarrier spacing for a component carrier. A subcarrier spacing is equal to the reciprocal of a symbol length on the component carrier. Thus, a component carrier associated with a wider subcarrier spacing may be associated with a shorter symbol length. The BS may configure semi-persistent resources on multiple component carriers. For example, different SPS/CG configurations may be used across different component carriers. In some aspects, the different component carriers may have different subcarrier spacings, such that different SPS/CG occasions have different lengths. A group configuration identifier may be associated with semi-persistent resources across multiple component carriers for the same UE or for different UEs. For example, a group configuration identifier may be pre-configured to include SPS/CG configurations across component carriers for the same UE or for different UEs.

In some aspects, semi-persistent resources may be configured on discontinuous frequency resources. For example, a single SPS configuration or a single CG configuration may include a semi-persistent resource on a first sub-band and a semi-persistent resource on a second sub-band that is not contiguous with the first sub-band (e.g., the first sub-band and the second sub-band may not be adjacent to each other in frequency, may not be consecutive with each other, may be separated by at least one sub-band, or the like). As another example, the BS may configure a first SPS/CG configuration on a first sub-band and a second SPS/CG configuration on a second sub-band that is non-contiguous with the first sub-band, where the first SPS/CG configuration and the second SPS/CG configuration are activatable via a single indication (as described below). A sub-band is a frequency division of a frequency band of a UE. For example, a component carrier may be subdivided into two or more sub-bands. A sub-band may be composed of a contiguous block of one or more subcarriers. A group configuration identifier may be associated with semi-persistent resources across sub-bands for the same UE or for different UEs. For example, a group configuration identifier may be pre-configured to include SPS/CG configurations across sub-bands for the same UE or for different UEs. The configuration of semi-persistent resources on non-contiguous sub-bands may enable the UE and the base station to avoid sub-bands associated with interference, thereby increasing throughput.

As shown by reference number 520, the BS may transmit, and the first UE may receive, an indication. For example, the BS may transmit the indication to each UE of the plurality of UEs configured with the plurality of semi-persistent resources. As shown, the indication is transmitted via a DCI message. For example, the DCI message may be a single DCI message, such as a group common DCI message directed to each UE of the plurality of UEs. In some aspects, the indication may be associated with a group configuration identifier. For example, the group configuration identifier may be associated with the plurality of semi-persistent resources (e.g., the SPS configuration(s) and/or CG configuration(s) that indicate the plurality of semi-persistent resources). In some aspects, the DCI message may indicate one or more sets of parameters, such as one or more sets of parameters described in connection with reference number 510. For example, the DCI message may indicate one or more sets of parameters for one or more semi-persistent resources activated by the DCI message.

The indication may activate the plurality of semi-persistent resources. In some aspects, the indication may indicate a plurality of resource allocations corresponding to the plurality of semi-persistent resources. For example, the indication may include a scheduling field for each semi-persistent resource and a UE identifier corresponding to each scheduling field. Thus, by identifying each scheduling field and the corresponding UE, the first UE can determine whether a given resource is associated with FD communication or HD communication. Then, the first UE may select an appropriate set of parameters for communication on the given resource.

As shown by reference number 530, one or more of the first UE or the base station may identify one or more sets of parameters. The one or more sets of parameters may include one or more sets of parameters associated with FD communication on a semi-persistent resource and/or one or more sets of parameters associated with HD communication on a semi-persistent resource. In some aspects, the first UE or the base station may identify the one or more sets of parameters prior to transmitting/receiving the DCI message. For example, the BS may configure the first UE with the one or more sets of parameters via the configuration information. As another example, the BS and/or the first UE may be pre-configured with the one or more sets of parameters. in some aspects, the one or more sets of parameters may be indicated via one or more of the configuration information or the DCI message.

As shown by reference number 540, the first UE and the base station may communicate on one or more semi-persistent resources. For example, the first UE and the base station may communicate on one or more SPS occasions and/or one or more CG occasions activated by the DCI message and configured for the first UE. The first UE and the BS may use one or more sets of parameters, such as one or more sets of parameters configured for the one or more semi-persistent resources. For example, the first UE and the BS may use one or more sets of parameters that are mapped to the one or more semi-persistent resources (such as based at least in part on the configuration information or the indication), or may determine the one or more sets of parameters (such as based at least in part on whether the one or more semi-persistent resources are associated with FD communication or HD communication). The BS may communicate with the plurality of UEs via the plurality of semi-persistent resources.

In this way, the base station may activate multiple SPS/CG configurations using a single DCI message. The first UE (and/or other UEs) may use the single DCI message to determine whether resources activated by the single DCI message are associated with FD communications or HD communications, which enables the first UE and/or the BS to use a set of parameters appropriate for the resources. In this way, throughput and reliability are improved. Furthermore, overhead is reduced relative to individually activating each SPS configuration or CG configuration via separate DCI.

As indicated above, FIG. 5 is provided as an example. Other examples may differ from what is described with regard to FIG. 5.

Figure 6:
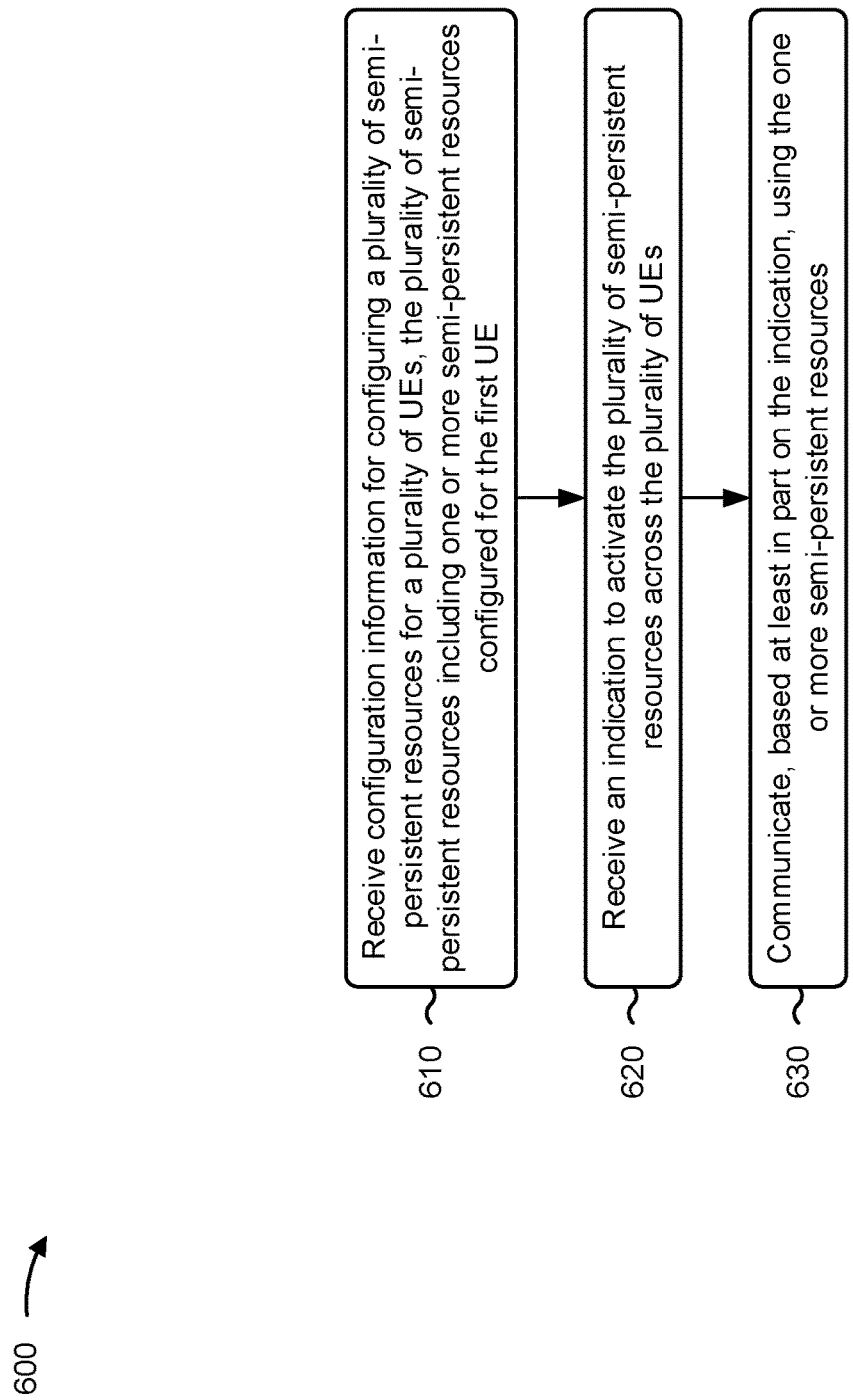
FIG. 6 is a diagram illustrating an example process performed, for example, by a first UE, in accordance with the present disclosure.

FIG. 6 is a diagram illustrating an example process 600 performed, for example, by a first UE, in accordance with the present disclosure. Example process 600 is an example where an apparatus of the first UE (e.g., UE 120) performs operations associated with full-duplex scheduling across multiple user equipment.

As shown in FIG. 6, in some aspects, process 600 may include receiving configuration information for configuring a plurality of semi-persistent resources for a plurality of UEs, the plurality of semi-persistent resources including one or more semi-persistent resources configured for the first UE (block 610). For example, the first UE (e.g., using communication manager 140 and/or reception component 802, depicted in FIG. 8) may receive configuration information for configuring a plurality of semi-persistent resources for a plurality of UEs, the plurality of semi-persistent resources including one or more semi-persistent resources configured for the first UE, as described above.

As further shown in FIG. 6, in some aspects, process 600 may include receiving an indication to activate the plurality of semi-persistent resources across the plurality of UEs (block 620). For example, the first UE (e.g., using communication manager 140 and/or reception component 802, depicted in FIG. 8) may receive an indication to activate the plurality of semi-persistent resources across the plurality of UEs, as described above.

As further shown in FIG. 6, in some aspects, process 600 may include communicating, based at least in part on the indication, using the one or more semi-persistent resources (block 630). For example, the first UE (e.g., using communication manager 140, reception component 802, and/or transmission component 804, depicted in FIG. 8) may communicate, based at least in part on the indication, using the one or more semi-persistent resources, as described above.

Process 600 may include additional aspects, such as any single aspect or any combination of aspects described below and/or in connection with one or more other processes described elsewhere herein.

In a first aspect, the configuration information is received in a single radio resource control message.

In a second aspect, alone or in combination with the first aspect, the indication is received via group common downlink control information signaling.

In a third aspect, alone or in combination with one or more of the first and second aspects, the process 600 further comprises identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein communicating on the one or more semi-persistent resources further comprises performing the communication on the semi-persistent resource in accordance with the one or more sets of parameters.

In a fourth aspect, alone or in combination with one or more of the first through third aspects, the one or more sets of parameters include at least one of: a modulation and coding scheme, a beam, a transmit power, a precoder, a rank indicator, a timing advance, or a guard band.

In a fifth aspect, alone or in combination with one or more of the first through fourth aspects, the one or more sets of parameters are included in a plurality of sets of parameters configured for different semi-persistent resources.

In a sixth aspect, alone or in combination with one or more of the first through fifth aspects, the one or more sets of parameters include a first set of parameters associated with a full-duplex communication mode and a second set of parameters associated with a half-duplex communication mode.

In a seventh aspect, alone or in combination with one or more of the first and sixth aspects, the plurality of semi-persistent resources includes a first semi-persistent resource of a first length and a second semi-persistent resource of a second length different than the first length.

In an eighth aspect, alone or in combination with one or more of the first through seventh aspects, the one or more semi-persistent resources include a first semi-persistent resource on a first component carrier and a second semi-persistent resource on a second component carrier, and the indication activates the first semi-persistent resource and the second semi-persistent resource.

In a ninth aspect, alone or in combination with one or more of the first through eighth aspects, the first component carrier is associated with a first subcarrier spacing and the second component carrier is associated with a second subcarrier spacing different than the first subcarrier spacing.

In a tenth aspect, alone or in combination with one or more of the first through ninth aspects, the indication indicates the plurality of semi-persistent resources based at least in part on a group configuration identifier associated with the plurality of semi-persistent resources.

In an eleventh aspect, alone or in combination with one or more of the first through tenth aspects, the indication indicates a UE identifier and a corresponding scheduling field for each UE of the plurality of UEs.

In a twelfth aspect, alone or in combination with one or more of the first through eleventh aspects, a semi-persistent resource, of the plurality of semi-persistent resources, includes a first sub-band and a second sub-band that are non-contiguous with each other.

In a thirteenth aspect, alone or in combination with one or more of the first through twelfth aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In a fourteenth aspect, alone or in combination with one or more of the first through thirteenth aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
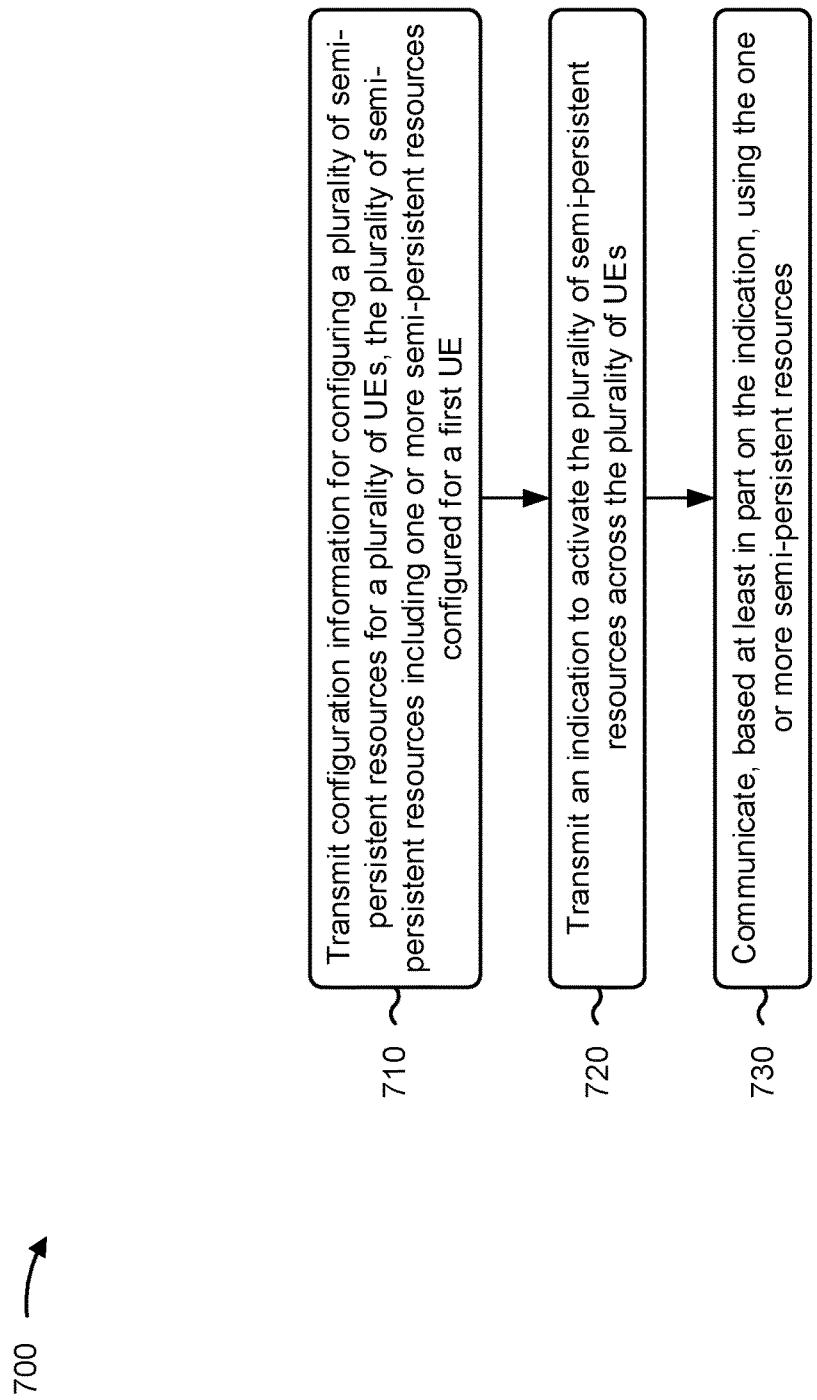
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where an apparatus of the base station (e.g., base station 110) performs operations associated with full-duplex scheduling across multiple user equipment.

As shown in FIG. 7, in some aspects, process 700 may include transmitting configuration information for configuring a plurality of semi-persistent resources for a plurality of UEs, the plurality of semi-persistent resources including one or more semi-persistent resources configured for a first UE (block 710). For example, the base station (e.g., using communication manager 150 and/or transmission component 904, depicted in FIG. 9) may transmit configuration information for configuring a plurality of semi-persistent resources for a plurality of UEs, the plurality of semi-persistent resources including one or more semi-persistent resources configured for a first UE, as described above.

As further shown in FIG. 7, in some aspects, process 700 may include transmitting an indication to activate the plurality of semi-persistent resources across the plurality of UEs (block 720). For example, the base station (e.g., using communication manager 150 and/or transmission component 904, depicted in FIG. 9) may transmit an indication to activate the plurality of semi-persistent resources across the plurality of UEs, as described above.

As further shown in FIG. 7, in some aspects, process 700 may include communicating, based at least in part on the indication, using the one or more semi-persistent resources (block 730). For example, the base station (e.g., using communication manager 150, reception component 902 and/or transmission component 904, depicted in FIG. 9) may communicate, based at least in part on the indication, using the one or more semi-persistent resources, as described above.

Process 700 may include additional aspects, such as any single aspect or any combination of aspects described below and/or in connection with one or more other processes described elsewhere herein.

In a first aspect, the configuration information is transmitted in a single radio resource control message.

In a second aspect, alone or in combination with the first aspect, the indication is transmitted via group common downlink control information signaling.

In a third aspect, alone or in combination with one or more of the first and second aspects, the process 700 further comprises identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, and wherein communicating on the one or more semi-persistent resources further comprises performing the communication on the semi-persistent resource in accordance with the one or more sets of parameters.

In a fourth aspect, alone or in combination with one or more of the first through third aspects, the one or more sets of parameters include at least one of: a modulation and coding scheme, a beam, a transmit power, a precoder, a rank indicator, a timing advance, or a guard band.

In a fifth aspect, alone or in combination with one or more of the first through fourth aspects, the one or more sets of parameters are included in a plurality of sets of parameters configured for different semi-persistent resources.

In a sixth aspect, alone or in combination with one or more of the first through fifth aspects, the one or more sets of parameters include a first set of parameters associated with a full-duplex communication mode and a second set of parameters associated with a half-duplex communication mode.

In a seventh aspect, alone or in combination with one or more of the first and sixth aspects, the plurality of semi-persistent resources includes a first semi-persistent resource of a first length and a second semi-persistent resource of a second length different than the first length.

In an eighth aspect, alone or in combination with one or more of the first through seventh aspects, the one or more semi-persistent resources include a first semi-persistent resource on a first component carrier and a second semi-persistent resource on a second component carrier, and the indication is configured to activate the first semi-persistent resource and the second semi-persistent resource.

In a ninth aspect, alone or in combination with one or more of the first through eighth aspects, the first component carrier is associated with a first subcarrier spacing and the second component carrier is associated with a second subcarrier spacing different than the first subcarrier spacing.

In a tenth aspect, alone or in combination with one or more of the first through ninth aspects, the indication indicates the plurality of semi-persistent resources based at least in part on a group configuration identifier associated with the plurality of semi-persistent resources.

In a eleventh aspect, alone or in combination with one or more of the first through tenth aspects, the indication indicates a UE identifier and a corresponding scheduling field for each UE of the plurality of UEs.

In a twelfth aspect, alone or in combination with one or more of the first through eleventh aspects, a semi-persistent resource, of the plurality of semi-persistent resources, includes a first sub-band and a second sub-band that are non-contiguous with each other.

In a thirteenth aspect, alone or in combination with one or more of the first through twelfth aspects, a first semi-persistent resource of the plurality of semi-persistent resources, associated with the first UE, is scheduled on a first sub-band, and a second semi-persistent resource of the plurality of semi-persistent resources, associated with a second UE of the plurality of UEs, is scheduled on a second sub-band that is non-contiguous with the first sub-band.

In a fourteenth aspect, alone or in combination with one or more of the first through thirteenth aspects, a first semi-persistent resource of the plurality of semi-persistent resources, associated with the first UE, is scheduled on a first component carrier, and a second semi-persistent resource of the plurality of semi-persistent resources, associated with a second UE of the plurality of UEs, is scheduled on a second component carrier.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
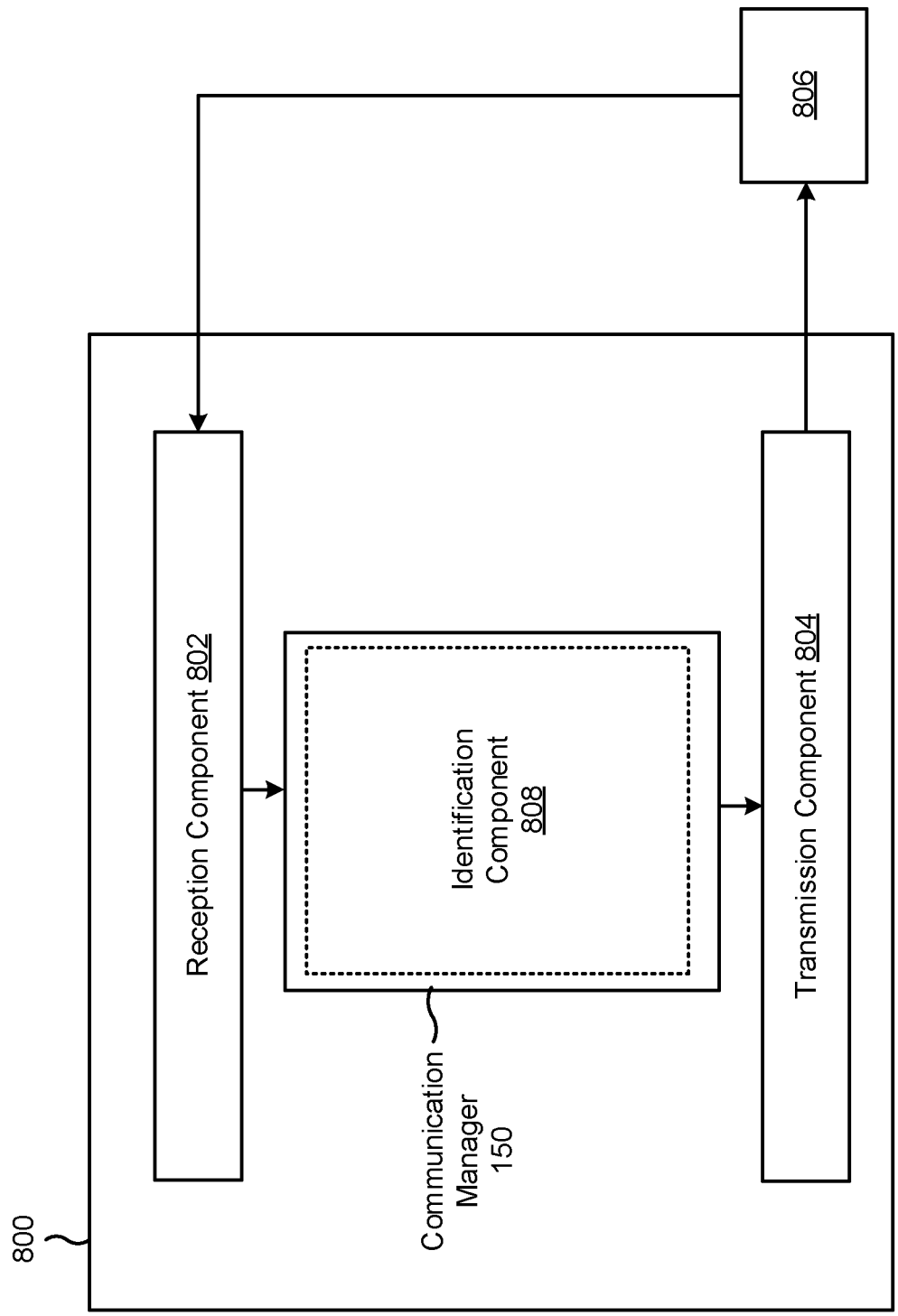
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include an identification component 808, among other examples.

In some aspects, the apparatus 800 may be configured to perform one or more operations described herein in connection with FIGS. 3-5. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive configuration information for configuring a plurality of semi-persistent resources for a plurality of UEs, the plurality of semi-persistent resources including one or more semi-persistent resources configured for the first UE. The reception component 802 may receive an indication to activate the plurality of semi-persistent resources across the plurality of UEs. The reception component 802 or the transmission component 804 may communicate, based at least in part on the indication, using the one or more semi-persistent resources.

The identification component 808 may identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
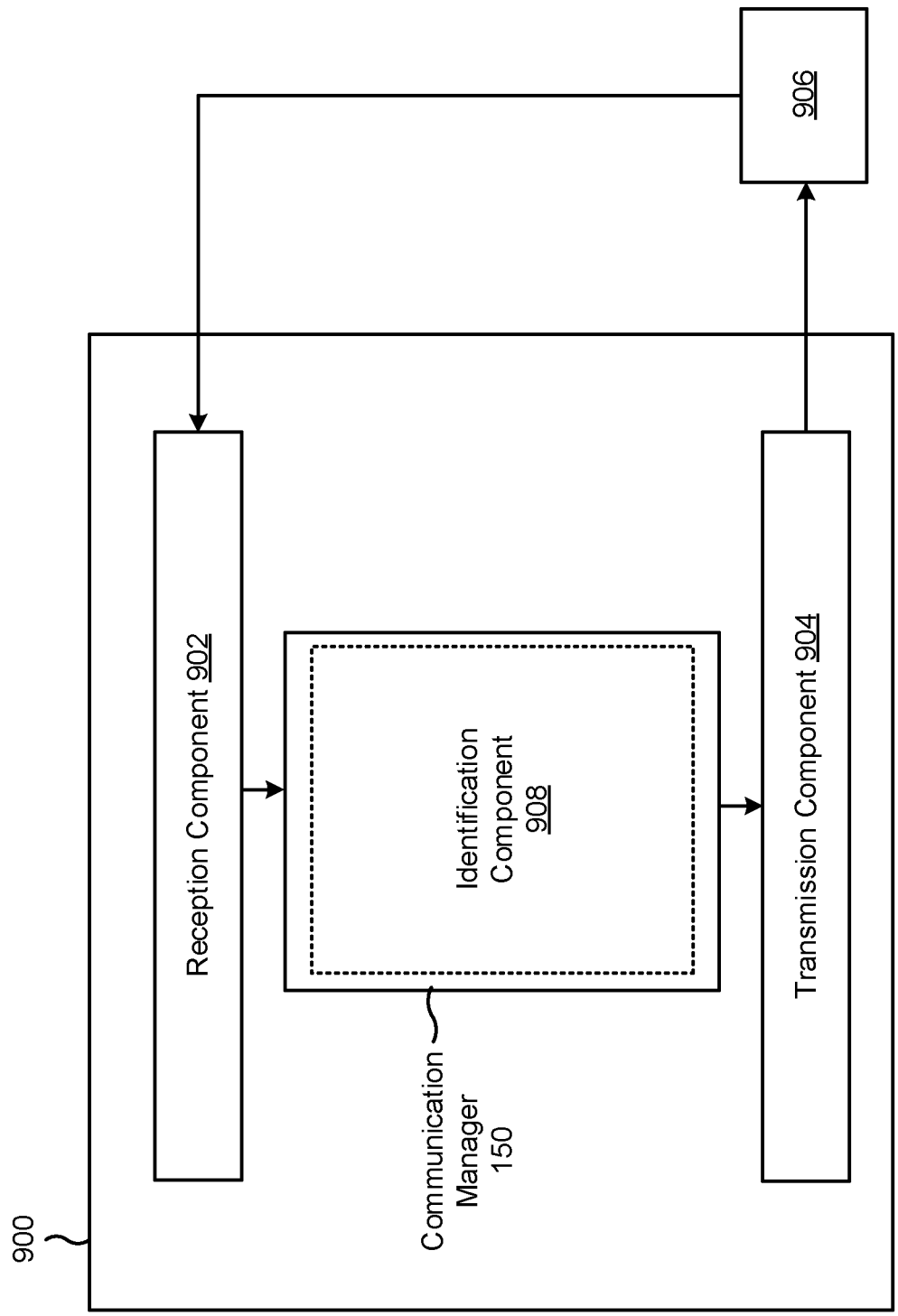
FIG. 9 is a diagram of an example apparatus 900 for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include an identification component 908, among other examples.

In some aspects, the apparatus 900 may be configured to perform one or more operations described herein in connection with FIGS. 3-5. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit configuration information for configuring a plurality of semi-persistent resources for a plurality of UEs, the plurality of semi-persistent resources including one or more semi-persistent resources configured for a first UE. The transmission component 904 may transmit an indication to activate the plurality of semi-persistent resources across the plurality of UEs. The transmission component 904 or the reception component 902 may communicate, based at least in part on the indication, using the one or more semi-persistent resources.

The identification component 908 may identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a first user equipment (UE), comprising: receiving configuration information for configuring a plurality of semi-persistent resources for a plurality of UEs, the plurality of semi-persistent resources including one or more semi-persistent resources configured for the first UE; receiving an indication to activate the plurality of semi-persistent resources across the plurality of UEs; and communicating, based at least in part on the indication, using the one or more semi-persistent resources.

Aspect 2: The method of Aspect 1, wherein the configuration information is received in a single radio resource control message.

Aspect 3: The method of any of Aspects 1-2, wherein the indication is received via group common downlink control information signaling.

Aspect 4: The method of any of Aspects 1-3, further comprising: identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, wherein communicating on the one or more semi-persistent resources further comprises: performing the communication on the semi-persistent resource in accordance with the one or more sets of parameters.

Aspect 5: The method of Aspect 4, wherein the one or more sets of parameters include at least one of: a modulation and coding scheme, a beam, a transmit power, a precoder, a rank indicator, a timing advance, or a guard band.

Aspect 6: The method of Aspect 4, wherein the one or more sets of parameters are included in a plurality of sets of parameters configured for different semi-persistent resources.

Aspect 7: The method of Aspect 4, wherein the one or more sets of parameters include a first set of parameters associated with a full-duplex communication mode and a second set of parameters associated with a half-duplex communication mode.

Aspect 8: The method of any of Aspects 1-7, wherein the plurality of semi-persistent resources includes a first semi-persistent resource of a first length and a second semi-persistent resource of a second length different than the first length.

Aspect 9: The method of any of Aspects 1-8, wherein the one or more semi-persistent resources include a first semi-persistent resource on a first component carrier and a second semi-persistent resource on a second component carrier, and wherein the indication activates the first semi-persistent resource and the second semi-persistent resource.

Aspect 10: The method of Aspect 9, wherein the first component carrier is associated with a first subcarrier spacing and the second component carrier is associated with a second subcarrier spacing different than the first subcarrier spacing.

Aspect 11: The method of any of Aspects 1-10, wherein the indication indicates the plurality of semi-persistent resources based at least in part on a group configuration identifier associated with the plurality of semi-persistent resources.

Aspect 12: The method of any of Aspects 1-11, wherein the indication indicates a UE identifier and a corresponding scheduling field for each UE of the plurality of UEs.

Aspect 13: The method of any of Aspects 1-12, wherein a semi-persistent resource, of the plurality of semi-persistent resources, includes a first sub-band and a second sub-band that are non-contiguous with each other.

Aspect 14: The method of any of Aspects 1-13, wherein a first semi-persistent resource of the plurality of semi-persistent resources, associated with the first UE, is scheduled on a first sub-band, and wherein a second semi-persistent resource of the plurality of semi-persistent resources, associated with a second UE of the plurality of UEs, is scheduled on a second sub-band that is non-contiguous with the first sub-band.

Aspect 15: The method of any of Aspects 1-14, wherein a first semi-persistent resource of the plurality of semi-persistent resources, associated with the first UE, is scheduled on a first component carrier, and wherein a second semi-persistent resource of the plurality of semi-persistent resources, associated with a second UE of the plurality of UEs, is scheduled on a second component carrier.

Aspect 16: A method of wireless communication performed by a base station, comprising: transmitting configuration information for configuring a plurality of semi-persistent resources for a plurality of user equipment (UEs), the plurality of semi-persistent resources including one or more semi-persistent resources configured for a first UE; transmitting an indication to activate the plurality of semi-persistent resources across the plurality of UEs; and communicating, based at least in part on the indication, using the one or more semi-persistent resources.

Aspect 17: The method of Aspect 16, wherein the configuration information is transmitted in a single radio resource control message.

Aspect 18: The method of any of Aspects 16-17, wherein the indication is transmitted via group common downlink control information signaling.

Aspect 19: The method of any of Aspects 16-18, further comprising: identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource, wherein the one or more processors, to communicate on the one or more semi-persistent resources, are configured to: perform the communication on the semi-persistent resource in accordance with the one or more sets of parameters.

Aspect 20: The method of Aspect 19, wherein the one or more sets of parameters include at least one of: a modulation and coding scheme, a beam, a transmit power, a precoder, a rank indicator, a timing advance, or a guard band.

Aspect 21: The method of Aspect 19, wherein the one or more sets of parameters are included in a plurality of sets of parameters configured for different semi-persistent resources.

Aspect 22: The method of Aspect 19, wherein the one or more sets of parameters include a first set of parameters associated with a full-duplex communication mode and a second set of parameters associated with a half-duplex communication mode.

Aspect 23: The method of any of Aspects 16-22, wherein the plurality of semi-persistent resources includes a first semi-persistent resource of a first length and a second semi-persistent resource of a second length different than the first length.

Aspect 24: The method of any of Aspects 16-23, wherein the one or more semi-persistent resources include a first semi-persistent resource on a first component carrier and a second semi-persistent resource on a second component carrier, and wherein the indication is configured to activate the first semi-persistent resource and the second semi-persistent resource.

Aspect 25: The method of Aspect 24, wherein the first component carrier is associated with a first subcarrier spacing and the second component carrier is associated with a second subcarrier spacing different than the first subcarrier spacing.

Aspect 26: The method of any of Aspects 16-25, wherein the indication indicates the plurality of semi-persistent resources based at least in part on a group configuration identifier associated with the plurality of semi-persistent resources.

Aspect 27: The method of any of Aspects 16-26, wherein the indication indicates a UE identifier and a corresponding scheduling field for each UE of the plurality of UEs.

Aspect 28: The method of any of Aspects 16-27, wherein a semi-persistent resource, of the plurality of semi-persistent resources, includes a first sub-band and a second sub-band that are non-contiguous with each other.

Aspect 29: The method of any of Aspects 16-28, wherein a first semi-persistent resource of the plurality of semi-persistent resources, associated with the first UE, is scheduled on a first sub-band, and wherein a second semi-persistent resource of the plurality of semi-persistent resources, associated with a second UE of the plurality of UEs, is scheduled on a second sub-band that is non-contiguous with the first sub-band.

Aspect 30: The method of any of Aspects 16-29, wherein a first semi-persistent resource of the plurality of semi-persistent resources, associated with the first UE, is scheduled on a first component carrier, and wherein a second semi-persistent resource of the plurality of semi-persistent resources, associated with a second UE of the plurality of UEs, is scheduled on a second component carrier.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving, in a single radio resource control message, configuration information for configuring a plurality of semi-persistent resources for a plurality of UEs, the plurality of semi-persistent resources including one or more uplink resources and one or more downlink resources, and the plurality of semi-persistent resources including one or more semi-persistent resources configured for the first UE;
   receiving an indication to activate the plurality of semi-persistent resources across the plurality of UEs; and
   communicating, based at least in part on the indication, using the one or more semi-persistent resources.

2. The method of claim 1, wherein the indication is received via group common downlink control information signaling.

3. The method of claim 1, further comprising:
   identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource,
   wherein communicating on the one or more semi-persistent resources further comprises:
      performing the communication on the semi-persistent resource in accordance with the one or more sets of parameters.

4. The method of claim 3, wherein the one or more sets of parameters include at least one of:
   a modulation and coding scheme,
   a beam,
   a transmit power,
   a precoder,
   a rank indicator,
   a timing advance, or
   a guard band.

5. The method of claim 3, wherein the one or more sets of parameters are included in a plurality of sets of parameters configured for different semi-persistent resources.

6. The method of claim 3, wherein the one or more sets of parameters include a first set of parameters associated with a full-duplex communication mode and a second set of parameters associated with a half-duplex communication mode.

7. The method of claim 1, wherein the plurality of semi-persistent resources includes a first semi-persistent resource of a first length and a second semi-persistent resource of a second length different than the first length.

8. The method of claim 1, wherein the one or more semi-persistent resources include a first semi-persistent resource on a first component carrier and a second semi-persistent resource on a second component carrier, and wherein the indication activates the first semi-persistent resource and the second semi-persistent resource.

9. The method of claim 1, wherein the indication indicates the plurality of semi-persistent resources based at least in part on a group configuration identifier associated with the plurality of semi-persistent resources.

10. The method of claim 1, wherein the indication indicates a UE identifier and a corresponding scheduling field for each UE of the plurality of UEs.

11. The method of claim 1, wherein a semi-persistent resource, of the plurality of semi-persistent resources, includes a first sub-band and a second sub-band that are non-contiguous with each other.

12. The method of claim 1, wherein a first semi-persistent resource of the plurality of semi-persistent resources, associated with the first UE, is scheduled on a first sub-band, and wherein a second semi-persistent resource of the plurality of semi-persistent resources, associated with a second UE of the plurality of UEs, is scheduled on a second sub-band that is non-contiguous with the first sub-band.

13. The method of claim 1, wherein a first semi-persistent resource of the plurality of semi-persistent resources, associated with the first UE, is scheduled on a first component carrier, and wherein a second semi-persistent resource of the plurality of semi-persistent resources, associated with a second UE of the plurality of UEs, is scheduled on a second component carrier.

14. The method of claim 1, wherein the one or more semi-persistent resources configured for the first UE include at least one of the one or more uplink resources and at least one of the one or more downlink resources.

15. A method of wireless communication performed by a base station, comprising:
transmitting, in a single radio resource control message, configuration information for configuring a plurality of semi-persistent resources for a plurality of user equipment (UEs), the plurality of semi-persistent resources including one or more uplink resources and one or more downlink resources, and the plurality of semi-persistent resources including one or more semi-persistent resources configured for a first UE;
transmitting an indication to activate the plurality of semi-persistent resources across the plurality of UEs; and
communicating, based at least in part on the indication, using the one or more semi-persistent resources.

16. The method of claim 15, wherein the indication is transmitted via group common downlink control information signaling.

17. The method of claim 15, further comprising:
identifying one or more sets of parameters for a communication on a semi-persistent resource of the one or more semi-persistent resources based at least in part on the indication, wherein identifying the one or more sets of parameters is based at least in part on a duplexing state of the communication on the semi-persistent resource,
wherein communicating on the one or more semi-persistent resources further comprises:
performing the communication on the semi-persistent resource in accordance with the one or more sets of parameters.

18. The method of claim 15, wherein the plurality of semi-persistent resources includes a first semi-persistent resource of a first length and a second semi-persistent resource of a second length different than the first length.

19. The method of claim 15, wherein the one or more semi-persistent resources include a first semi-persistent resource on a first component carrier and a second semi-persistent resource on a second component carrier, and wherein the indication is configured to activate the first semi-persistent resource and the second semi-persistent resource.

20. The method of claim 15, wherein the indication indicates the plurality of semi-persistent resources based at least in part on a group configuration identifier associated with the plurality of semi-persistent resources.

21. The method of claim 15, wherein a semi-persistent resource, of the plurality of semi-persistent resources, includes a first sub-band and a second sub-band that are non-contiguous with each other.

22. The method of claim 15, wherein a first semi-persistent resource of the plurality of semi-persistent resources, associated with the first UE, is scheduled on a first sub-band, and wherein a second semi-persistent resource of the plurality of semi-persistent resources, associated with a second UE of the plurality of UEs, is scheduled on a second sub-band that is non-contiguous with the first sub-band.

23. The method of claim 15, wherein a first semi-persistent resource of the plurality of semi-persistent resources, associated with the first UE, is scheduled on a first component carrier, and wherein a second semi-persistent resource of the plurality of semi-persistent resources, associated with a second UE of the plurality of UEs, is scheduled on a second component carrier.

24. A first user equipment (UE) for wireless communication, comprising:
a memory; and
one or more processors, coupled to the memory, configured to:
receive, in a single radio resource control message, configuration information for configuring a plurality of semi-persistent resources for a plurality of UEs, the plurality of semi-persistent resources including one or more uplink resources and one or more downlink resources, and the plurality of semi-persistent resources including one or more semi-persistent resources configured for the first UE;
receive an indication to activate the plurality of semi-persistent resources across the plurality of UEs; and
communicate, based at least in part on the indication, using the one or more semi-persistent resources.

25. The first UE of claim 24, wherein the indication is received via group common downlink control information signaling.

26. The first UE of claim 24, wherein the one or more processors are further configured to:
identify one or more sets of parameters for a communication on a semi-persistent resource of the one or more semi-persistent resources based at least in part on the indication, wherein identifying the one or more sets of parameters is based at least in part on a duplexing state of the communication on the semi-persistent resource,
wherein the one or more processors, to communicate on the one or more semi-persistent resources, are configured to:
perform the communication on the semi-persistent resource in accordance with the one or more sets of parameters.

27. The first UE of claim 24, wherein the one or more semi-persistent resources configured for the first UE include at least one of the one or more uplink resources and at least one of the one or more downlink resources.

28. A base station for wireless communication, comprising:
a memory; and
one or more processors, coupled to the memory, configured to:
transmit, in a single radio resource control message, configuration information for configuring a plurality of semi-persistent resources for a plurality of user equipment (UEs), the plurality of semi-persistent resources including one or more uplink resources and one or more downlink resources, and the plurality of semi-persistent resources including one or more semi-persistent resources configured for a first UE;

transmit an indication to activate the plurality of semi-persistent resources across the plurality of UEs; and communicate, based at least in part on the indication, using the one or more semi-persistent resources.

29. The base station of claim 28, wherein the indication is transmitted via group common downlink control information signaling.

30. The base station of claim 28, wherein the one or more semi-persistent resources configured for the first UE include at least one of the one or more uplink resources and at least one of the one or more downlink resources.

* * * * *